United States Patent Office 2,875,001
Patented Feb. 24, 1959

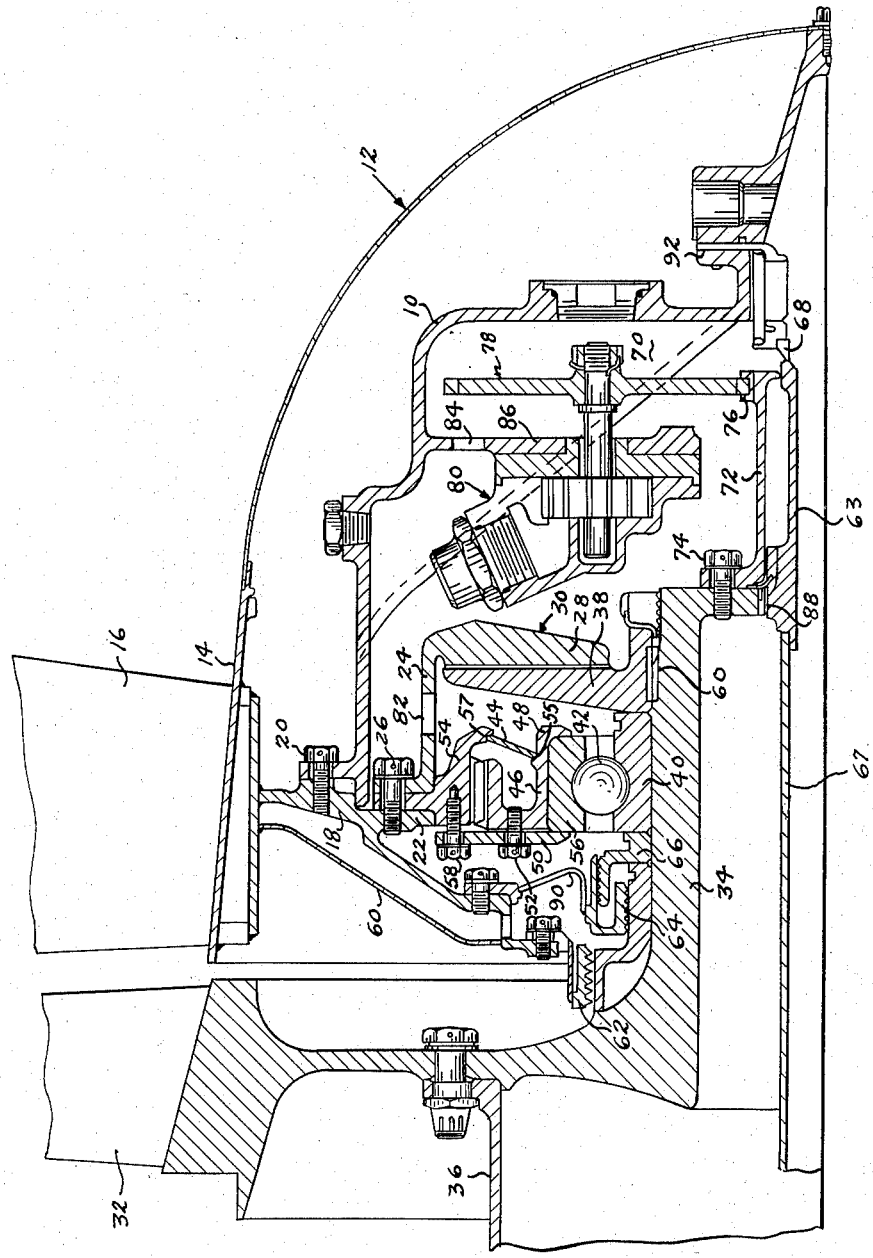

2,875,001

THRUST BEARING SYSTEM

Robert O. Miller and Joseph M. O'Toole, Cincinnati, Ohio, assignors to the United States of America as represented by the Secretary of the Air Force Application January 23, 1956, Serial No. 560,912

6 Claims. (Cl. 308—35)

The present invention relates to an improved thrust bearing system and, more particularly, to a two-bearing arrangement for an axial compressor in a turbo jet engine or the like.

As is well known, one of the main difficulties encountered in the operation of jet engines is the terrific thrust load which must be borne when the engine starts from a zero speed and accelerates to flying speeds. A further problem encountered is the air leakage which takes place through the seals, causing pressure to be an undesirable maximum where low pressures are desired and causing engine performance loss. It has been found that regular tapered land bearings with extensive bearing surfaces are capable of carrying high loads, but the starting torque is very high, particularly at low temperatures.

An object of the invention is the provision of a novel arrangement of bearings in a turbo jet engine whereby seal leakage is reduced to a minimum by reducing the diameters of the compressor seals to a minimum.

A further object of the invention is the provision of a two bearing system having a cushioning element interposed therebetween whereby initial thrust, carried initially by one bearing only, is later transferred to the other.

A further object of the invention is the provision of a unique combination of bearings which provides that the axial thrust in the initial stages of the starting of the engine be carried by the ball bearing and that the thrust and shearing torque be dampened by a resilient member which takes up a portion of the initial thrust and later transfers it to a high pressure thrust bearing.

A still further object of the present invention is the provision of a resilient cushioned member interposed between the axial thrust ball bearing and a land bearing of fairly large area.

In the drawing the figure is a fragmentary vertical sectional view of the upper half of the accessory dome or forward pad of a turbo jet aircraft showing the bearing system of the invention enclosed therein.

Referring more in detail to the drawing, an oil chamber casing 10 is inclosed in, and secured by any suitable means to, the accessory dome 12 of a jet propelled aircraft. The accessory dome is secured to a ring or hub member 14 from which the stator blades 16 (only one of which is shown) radiate outwardly. The stator blades 16 are anchored at their outer edges in a compressor case not shown and at their inward ends to a stator plate 18. The casing 10 is secured to the stator plate 18 by any suitable means, here shown as nut and bolt 20. The plate 18 is provided with an inwardly extending annular flange 22. A sleeve 24 is secured to the flange by any suitable means, here shown as bolt 26.

Integral with the sleeve 24 is the circular disk 28, which constitutes the stationary portion of a high capacity oil bearing 30 which may be of the Kingsbury or land-type bearing.

The rotor blades 32, only one of which is shown radiate in the usual manner from a compressor shaft 34, and are stabilized by a torque ring 36. Secured to the compressor shaft 34 and rotatable therewith is the rotating disk 38, which is the rotating portion of the high capacity oil bearing 30.

Secured also to the compressor shaft 34 and mounted to rotate therewith is the member 40 which constitutes the inner race of a ball bearing 42. A Bellville washer 44 or spring member, formed of resilient steel or other suitable resilient material is the shape of the frustum of a cone and is interposed between the ball bearing 42 and the high capacity oil bearing 30 by the following means. An annular bracket or cage member 46 is provided with a shoulder 48. A plate 50 is attached to a portion of the member 46 by bolt 52. The plate 50 and the bracket 46 thus form a cage for the ball bearing which moves axially with the ball race and the compressor shaft. The outer portion of the member 46 is splined to an annular bracket 54 for sliding connection. The outer ball race 56 of the ball bearing 42 is held between the shoulder 48 and the plate 50. The member 46 and the member 54 are provided with seating shoulders 55 and 57 for the purpose of providing retention and seating of the inner and outer edges respectively of the Bellville washer member 44. The member 54 is rigidly secured to the sleeve member 24, and thus to the casing 10, by means of the nut and bolt connection 26, and is secured for a certain amount of play to the plate 50 by means of the bolt 58 which has a sliding engagement through an aperture in the plate 50. The conical diaphragm 60 is welded or otherwise secured to the stator blade 16 or the ring member 14 at its outer circumference and serves as a closure shield between the area to the left, as shown in the drawing and the other area existing in the accessory dome.

Since it is the purpose of this invention to allow for a certain amount of axial movement of all of the rotating parts of the device, the labyrinth seals 62, 64 and 66 provide oil seals and also permit axial movement of the compressor shaft 34 and all of the rotating parts carried thereby. The cylindrical hollow shaft 67 provides for air circulation into the dome 12 and a member 68 provides a seal for the oil chamber 70. The hollow shaft 63 is splined at 88 to the rotary part 34. A sleeve member 72 is rigidly attached to the compressor shaft 34 by any suitable means such as bolt 74. The sleeve member 72 is provided with gear teeth 76, which mesh with and drive a gear wheel 78 which in turn operates an oil pump 80. Circulation of oil in the oil chamber 70 is aided by openings 82 in the sleeve 24 and the opening 84 in the spider member 86 which supports the oil pump 80.

An annular flexible ring shaped oil seal 90 is secured at its outer periphery to the inner portion of the plate 18 and at its inner periphery to the oil seal elements 64 and 66.

The operation of the device is as follows:

In the initial stages of starting, the radial thrust is carried by the ball bearing 42. This radial thrust is taken up and dampened by the resilience of the conical Bellville washer or spring member 44 which allows play or a certain amount of axial movement of the rotary parts. At zero speed and in the initial stages of starting, the bearing faces of members 28 and 38 remain a certain distance apart to alleviate the high starting torque condition. As the speed increases, the axial thrust which was previously carried by the ball bearing 42 and cushioned by the washer 44, is gradually transferred to the high capacity oil bearing 30. During all stages, the radial thrust is carried by ball bearing 42.

The deflection is limited to the amount of preset initial clearance between the faces of the land type thrust bearing 30. The predetermined maximum thrust load on the ball bearing 42 can be limited by the proper choice or design of the Bellville washer 44.

We claim:

1. A bearing system for a jet engine comprising a ball bearing having an inner race and an outer race for receiving radial thrust, said inner race revolving with said compressor shaft, an annular frusto-conically shaped resilient metallic washer for absorbing axial thrust, a ball race retaining member seating the inner edge of said resilient washer, an annular member seating the outer edge of said resilient washer, said ball race retaining member and said annular member being splined together for relative axial movement, a plate, means for securing said ball race retaining member to said plate, means for securing said annular member to said plate to allow for said relative axial movement, a high capacity oil bearing comprised of a stationary bearing member and a rotary bearing member, said stationary member rigidly attached to said annular member to receive the forward thrust of said rotary bearing member, said rotary bearing member being attached to said compressor shaft to rotate with and move axially with it.

2. A bearing system for absorbing thrust generated in bringing a jet engine from zero speed to higher speed, comprising a ball bearing having a rotating ball race and a stationary ball race, a high capacity oil bearing for ultimately receiving axial thrust, a frusto-conically shaped resilient steel washer positioned between said ball bearing and said high capacity oil bearing for absorbing the initial axial thrust and yieldable under predetermined axial thrust, thus forming a cushion between said ball bearing and said high capacity oil bearing to take up a portion of the axial thrust during starting and operation of the jet engine.

3. In a bearing system for an axial compressor wherein rotating portions are subjected to axial thrusting movement with reference to stationary portions and wherein axial play is provided therebetween, a ball bearing carried in a cage, said cage comprising an inner race and an outer race, means for eventually bearing the complete load of axial thrust, said means comprising a high pressure land bearing having a stationary portion and a rotating portion, means for initially cushioning said axial thrust to prevent its sudden complete application to said land bearing, said last named means comprising a bracket attached to said outer race, said bracket provided with a shoulder, a resilient annular frusto conical member having an inner circumferential edge seated on said shoulder, a member splined to said bracket for relative axial movement, a shoulder on said member for seating the outer circumferential edge of said resilient member, said splined member having rigid connection with the stationary portion of said land bearing.

4. In a bearing system for a jet engine wherein rotating portions are subjected to axial thrust and wherein axial play is provided therebetween, means for taking the eventual load of axial thrust, said means comprising a land bearing having a stationary portion and a rotating portion, means for initially cushioning the axial thrust, said last named means comprising an annular frusto conical resilient element, the outer circumference of said element being seated immovably in a bracket having immovable connection with the stationary portion of said land bearing, the inner circumference of said frusto conical resilient element being seated in an element movable with and subjected to the axial thrust of said rotating elements.

5. A bearing system for an axial compressor having a casing and a compressor shaft, comprising a radial thrust-carrying ball bearing mounted in a cage, said cage being axially movable with the compressor shaft of said compressor, a splined connection between said cage and said casing to allow axial movement of said cage relative to said casing, a high capacity oil bearing having a rotating portion and a stationary portion positioned, at zero speed of said compressor shaft, a distance apart from one another, means for damping the axial movement of said compressor shaft and said cage to relieve said ball bearing of axial thrust and said high capacity oil bearing of initial high torque during initial stages of starting, said means comprising an annular resilient member seated at its inner circumferential edge in said cage, its outer circumferential edge having rigid seating connection with said casing.

6. In a bearing system for an axial compressor wherein rotating portions are subjected to axial thrusting movement with reference to stationary portions, and wherein axial play is provided therebetween, a ball bearing carried in a cage, an inner race and an outer race on said cage, means for eventually carrying the complete load of axial thrust, said means comprising a high pressure land bearing having a stationary portion and a rotating portion, means for initially cushioning said axial thrust to prevent its sudden and complete application to said land bearing, said last named means comprising a first annular bracket and a second annular bracket having splined and sliding connection with each other, the first bracket being rigidly attached to said outer race and the second bracket having rigid connection with the stationary portion of said land bearing, a resilient frusto conical element interposed between said brackets, its inner and outer circumferential edges being seated in said first and second brackets respectively.

References Cited in the file of this patent

UNITED STATES PATENTS

| | | |
|---|---|---|
| 1,993,809 | Schnelle | Mar. 12, 1935 |
| 2,490,784 | Davenport | Dec. 13, 1949 |